United States Patent
Gangumalla et al.

(10) Patent No.: US 12,323,093 B2
(45) Date of Patent: Jun. 3, 2025

(54) PHOTOVOLTAIC MODULE SUPPORT SYSTEM AND MOUNT ASSEMBLY

(71) Applicant: Unirac Inc., Albuquerque, NM (US)

(72) Inventors: Deepthi Gangumalla, Hyderabad (IN); Sindhu Madhavi, Hyderabad (IN); Nikhil Babu, Hyderabad (IN); Austin Graham, Albuquerque, NM (US)

(73) Assignee: Unirac, Inc., Albuquerque, NM (US)

( * ) Notice: Subject to any disclaimer, the term of this patent is extended or adjusted under 35 U.S.C. 154(b) by 592 days.

(21) Appl. No.: 17/565,210

(22) Filed: Dec. 29, 2021

(65) Prior Publication Data

US 2023/0208351 A1    Jun. 29, 2023

(51) Int. Cl.
| | |
|---|---|
| *H02S 30/10* | (2014.01) |
| *F24S 25/13* | (2018.01) |
| *F24S 25/634* | (2018.01) |
| *F24S 25/00* | (2018.01) |
| *F24S 25/60* | (2018.01) |
| *H02S 20/23* | (2014.01) |
| *H02S 20/32* | (2014.01) |

(52) U.S. Cl.
CPC .............. *H02S 30/10* (2014.12); *F24S 25/13* (2018.05); *F24S 25/634* (2018.05); *F24S 2025/6006* (2018.05); *F24S 2025/803* (2018.05); *H02S 20/23* (2014.12); *H02S 20/32* (2014.12)

(58) Field of Classification Search
CPC .......... H02S 30/10; H02S 20/23; H02S 20/32; H02S 30/00; H02S 20/20; H02S 20/30; F24S 25/13; F24S 25/634; F24S 2025/6006; F24S 2025/803; F24S 25/12; F24S 2025/801; F24S 2025/807; F24S 25/632; F24S 25/65; Y02E 10/47; Y02E 10/50
See application file for complete search history.

(56) References Cited

U.S. PATENT DOCUMENTS

| | | |
|---|---|---|
| D496,248 S | 9/2004 | Liebendorfer |
| D808,066 S | 1/2018 | Young |
| D815,308 S | 4/2018 | Schuit |

(Continued)

FOREIGN PATENT DOCUMENTS

| | | |
|---|---|---|
| CN | 210183270 U | 3/2020 |
| EP | 2194205 A1 | 6/2010 |

OTHER PUBLICATIONS

PCT Search Report and Written Opinion mailed Apr. 10, 2023 for PCT application No. PCT/US2022/054197, 23 pages.

*Primary Examiner* — Michael Y Sun
(74) *Attorney, Agent, or Firm* — Lee & Hayes, P.C.

(57) ABSTRACT

A mounting assembly includes a rail configured to support a photovoltaic module. The rail includes a first slot, a second slot, and a web extending between the first slot and the second slot. The web being offset from a plane extending along an outer surface of the rail, so as to form a recess in the second side of the rail. The mount assembly further includes a clip configured to be secured to the rail and to a secondary structure. The clip includes a base having a flange extending from an end of the base, and an arm extending from the base in a second direction opposite the first direction, the flange being inserted in the second slot when the clip is secured to the rail and the secondary structure and at least a portion of the arm abuts the recess of the rail when the clip is secured to the rail.

9 Claims, 12 Drawing Sheets

(56) References Cited

U.S. PATENT DOCUMENTS

| | | |
|---|---|---|
| 10,256,767 B1 | 4/2019 | Bob et al. |
| 10,451,315 B2 | 10/2019 | Harris |
| 11,258,400 B2 | 2/2022 | Uppu |
| 2016/0285408 A1 | 9/2016 | Ash et al. |
| 2017/0040928 A1 | 2/2017 | Schuit et al. |
| 2017/0155356 A1 | 6/2017 | Schuit |
| 2019/0341878 A1* | 11/2019 | Watson .................. F24S 30/40 |
| 2020/0169214 A1 | 5/2020 | Koch et al. |

* cited by examiner

PHOTOVOLTAIC MODULE SUPPORT SYSTEM AND MOUNT ASSEMBLY

BACKGROUND

As the solar energy industry continues to grow, the equipment to mount photovoltaic (PV) modules (AKA "solar panels") on different types of structures and/or locations continues to adapt and improve as well. Though a variety of apparatuses exist to secure the PV modules and/or anchor PV module mounting assemblies, the number of parts and or different arrangements of the parts still leave much to be desired for an efficient and quick assembly to minimize the amount of time a worker may be working on a roof or in a similarly physically demanding or potentially hazardous condition.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

This disclosure is directed to a support system for supporting one or more photovoltaic (PV) modules (or "solar panels"). The support system includes various components that are configurable in one or more configurations (or "mounting assemblies") to comprise portions of the support system for the PV modules. Embodiments of the support system disclosed herein may be used on a roof or other structure and the support system provides components that are easily configurable between different assemblies that form different portions of the support system. As such, components of the support system may be implemented in multiple different configurations, thereby increasing the versatility of individual components of the support system and potentially reducing an amount of different types of components required to construct the support system.

Figure 1:
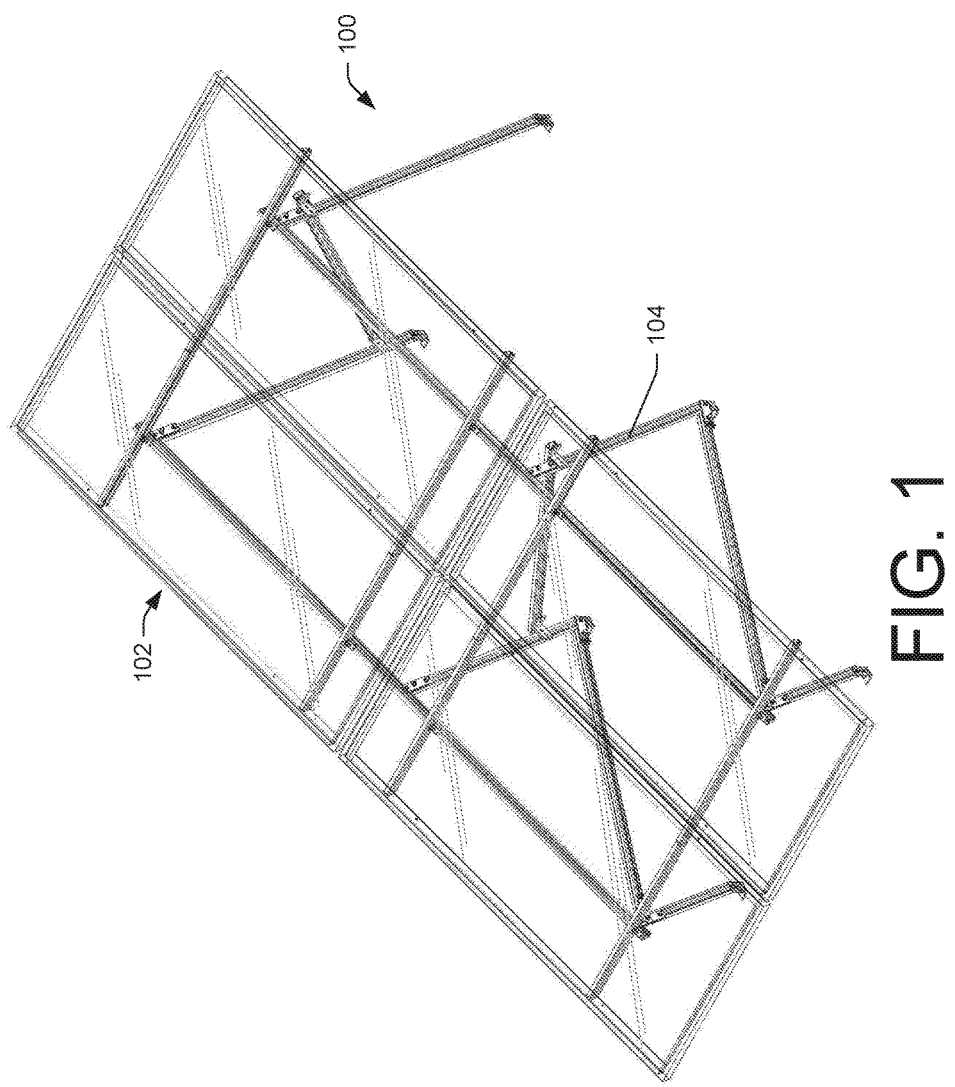
FIG. 1 illustrates a perspective view of a photovoltaic module support system, according to an embodiment of this disclosure.

Specifically, FIG. 1 illustrates an example support system 100 that supports one or more PV modules 102. The support system 100 may be secured to a roof or other structure on which the PV modules 102 may be mounted. Portions of the PV modules 102 are depicted as being transparent in order to show the underlying support system 100. While showing four PV modules 102 in a 2×2 (e.g., two wide and two high) configuration in FIG. 1, it is to be understood that the support system 100 may be configured to support any number of PV modules 102 in any configuration. By way of example, and not limitation, the support system 100 may be configured to support PV modules 102 in a two wide by one high (2×1) configuration, in a one high by two high (1×2) configuration, in a three wide by two high (3×2) configuration, in an eight wide by two high (8×2) or any other configuration. As mentioned previously, the support system 100 may be easily configurable to support any configuration and/or number of PV modules 102.

The support system 100 may include one or more rails 104. In an embodiment, the rails 104 may be identical or substantially similar components (shown and described with respect to FIG. 2) that are implemented in various assemblies throughout the support system 100, as will be shown and described further herein. The rails 104 of the support system 100 may provide a main structural support of the support system. For example, the support system 100 may include rails 104 that provide legs of the support system that are secured to a roof or other secondary structure and extend from the secondary structure to rails 104 that form cross-members (e.g., rails extending along the width and length of the support structure) of the support structure 100. As will be shown and described further herein below, the rails 104 may be coupled to various components of the support system 100 in various configurations, which are referred to herein as "mounting assemblies." For example, the rails 104 may be coupled to various clips, brackets, splices, or other components thereby forming various mounting assemblies of the support system 100.

Figure 2:
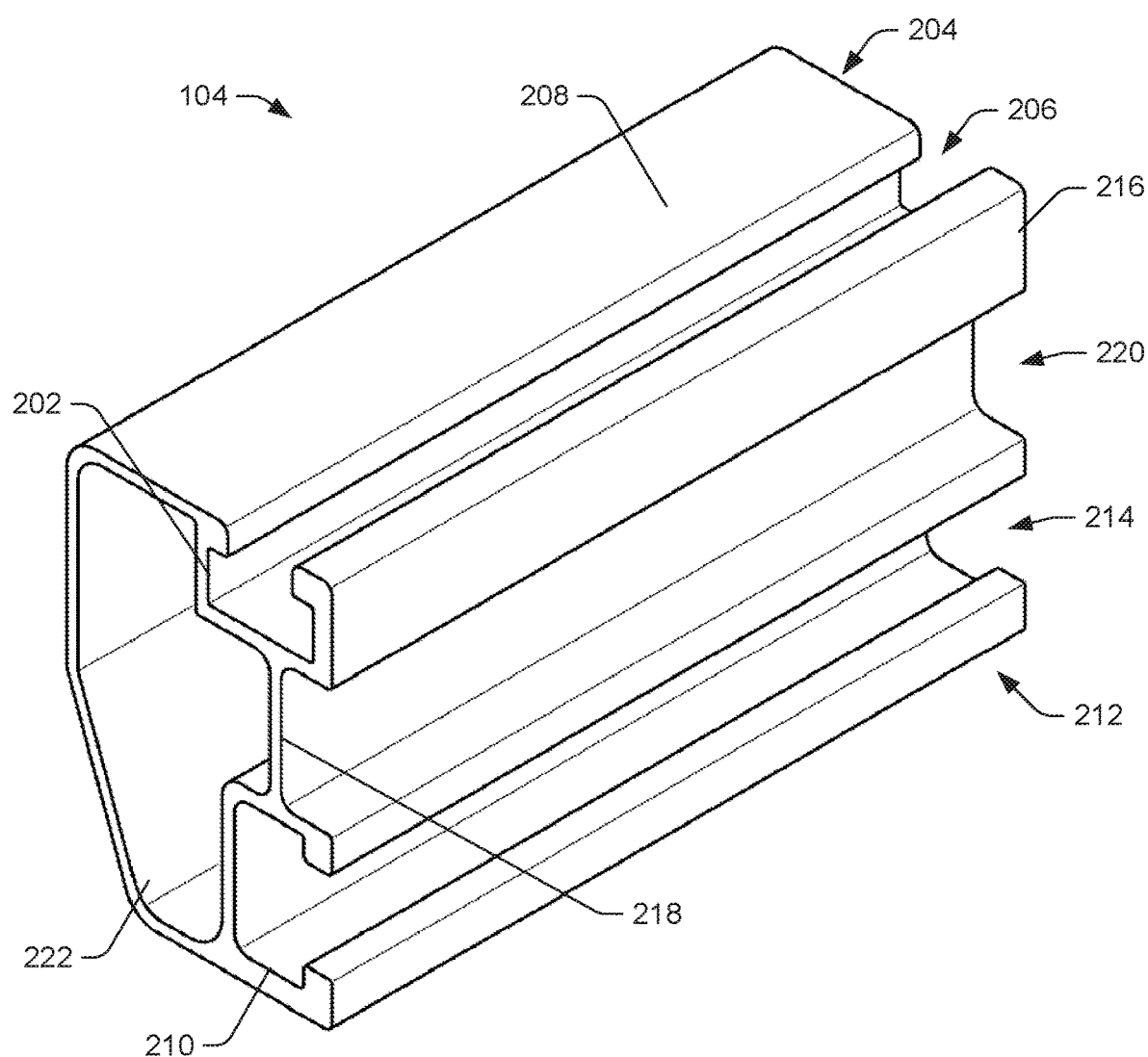
FIG. 2 illustrates a perspective view of a rail of the support system, according to an embodiment of this disclosure.

FIG. 2 depicts a perspective view of an example rail 104. It is to be understood that the rails 104 implemented in the support system 100 are not limited to the length shown in FIG. 2, but may be cut or otherwise shaped to predetermined lengths. As described previously, the rails 104 of the support system 100 may include the features shown and described with respect to FIG. 2. In an embodiment, the rail 104 may include a first slot 202 formed in a first side 204 of the rail 104. As such, the first slot 202 may be oriented such that an opening 206 of the first slot 202 is formed in the first side 204 of the rail. As shown in FIG. 2, the first slot 202 may be a substantially T-shaped slot. However, in an alternative embodiment not shown, the first slot 202 may be a different shape other than a T-shape. The first slot 202 may be shaped to receive a portion of a bolt (e.g., a head of a bolt), nut, or another portion of a fastener, bracket, clip, or other component therein. In an embodiment, the first slot 202 may be disposed below a plane extending along a first outer surface 208 of the rail 104 such that the first slot 202 does not extend above the plane of the first outer surface 208 of the rail 104. Furthermore, the first slot 202 of the rail 104 may extend along an entire length of the rail 104. Alternatively, in an embodiment, the first slot 202 may extend less than an entire length of the rail 104. For example, the first slot 202 may be enclosed on at least one end (not shown).

In an embodiment, the rail 104 may also include a second slot 210. The second slot 210 may be formed in a second side 212 of the rail 104. As such, the second slot 210 may be oriented such that an opening 214 of the second slot 210 is formed in the second side 212 of the rail 104. As shown in FIG. 2, the second slot 210 may be a substantially T-shaped slot. However, in an embodiment not shown, the second slot 210 may be a different shape other than a T-shape. In an embodiment, the second slot 210 may be shaped to receive a portion of a bolt (e.g., a head of a bolt), nut, or another portion of a fastener, bracket, clip, or other component therein. The first slot 202 and the second slot 210 may include substantially similar shapes such that components of the support system 100 may be interchangeably inserted in either the first slot 202 or the second slot 210. In an embodiment, the second slot 210 may be disposed below a plane extending along a second outer surface 216 of the rail 104 such that the second slot 210 does not extend beyond the plane of the second outer surface 216 of the rail 104. Furthermore, the second slot 210 may extend along an entire length of the rail 104. Alternatively, in an embodiment, the second slot 210 may extend less than an entire length of the rail 104. For example, the second slot 210 may be enclosed on at least one end (not shown).

In an embodiment, the rail 104 may include a web 218 extending between the first slot 202 and the second slot 210. The web 218 may extend in a substantially vertical direction. Furthermore, the web 218 may be offset from the plane of the second outer surface 216 of the rail 104, thereby forming a recess 220 in the second side 212 of the rail 104. In an embodiment, the recess 220 may be shaped to receive at least a portion of a bracket, clip, or other component of the support system 100 therein. Furthermore, in an embodiment, the rail 104 may include a cavity 222 extending along a length of the rail 104. The cavity 222 may be continuous along the length of the rail 104 and may be shaped to receive a splice rail (shown and described with respect to FIG. 3) therein.

Figure 3:
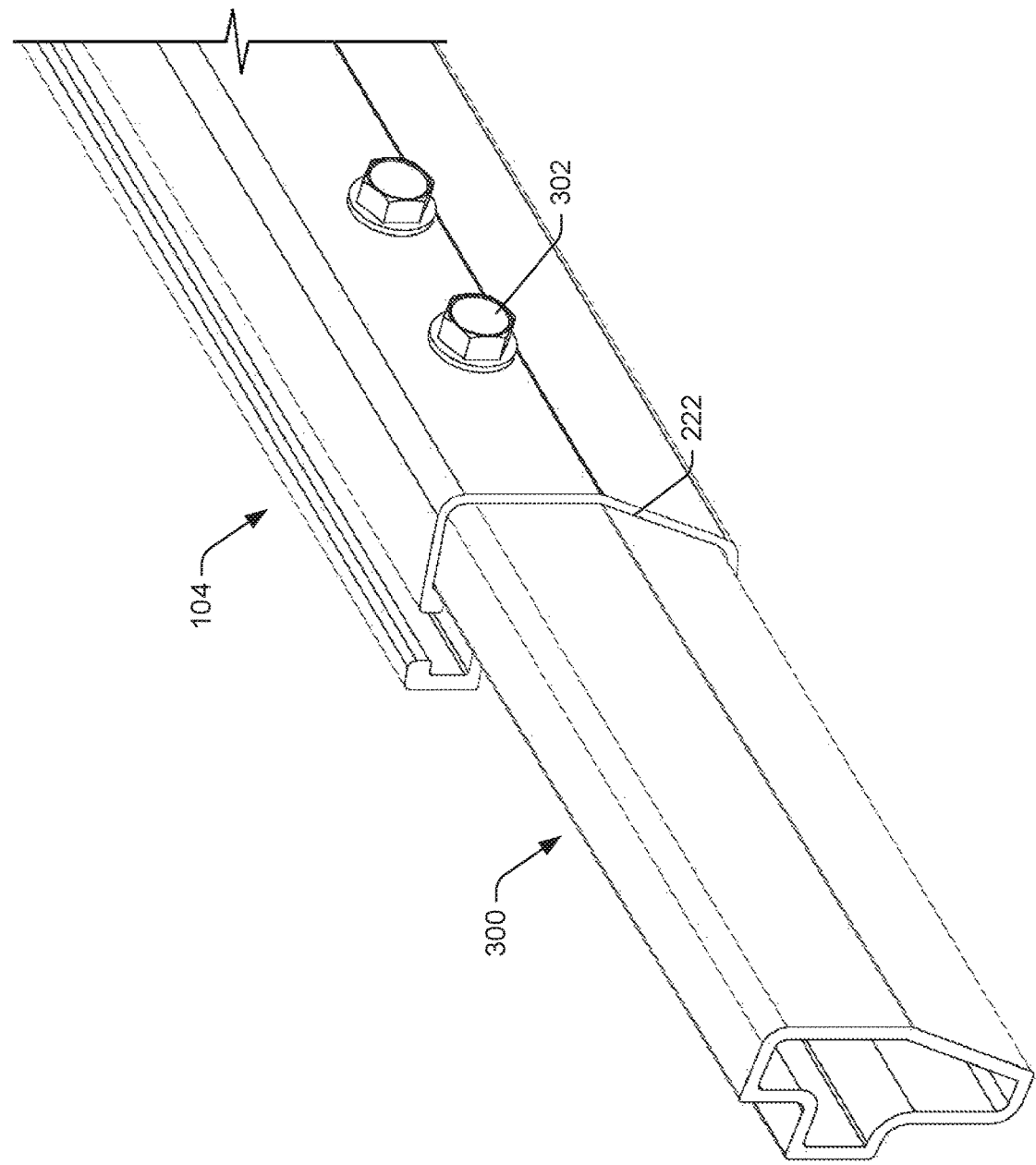
FIG. 3 illustrates a perspective view of a splice rail inserted into a rail of the support system, according to an embodiment of this disclosure.

FIG. 3 depicts a perspective view of a splice rail 300 inserted within a rail 104. As described previously, the rail 104 includes a cavity 222 and the splice rail 300 is shaped to correspond with a shape of the cavity 222 and to engage therein, such that the splice rail 300 is insertable therein. In an embodiment, the rail 104 may be a first rail and a first end of the splice rail 300 may be inserted into the cavity 222 of the first rail while a second end of the splice rail 300 may be inserted into a cavity of a second rail (not shown) having a cavity shaped the same as the cavity 222 of the rail 104. Thereby, multiple sections of rails 104 may be joined together in order to extend a length of the rail 104. As such, the first rail and the second rail may extend in a colinear direction. In an embodiment, one or more fasteners 302 may be implemented to ensure a secure coupling of the splice rail 300 to the rail 104. The fasteners 302 may be inserted through preformed apertures (not visible in FIG. 3, but understood to be beneath the heads of fasteners 302) in the splice rail 300 and/or the rail 104. Alternatively, the fasteners 302 may be self-drilled through the splice rail 300 and/or the rail 104, at the time of the installation.

Figure 4:
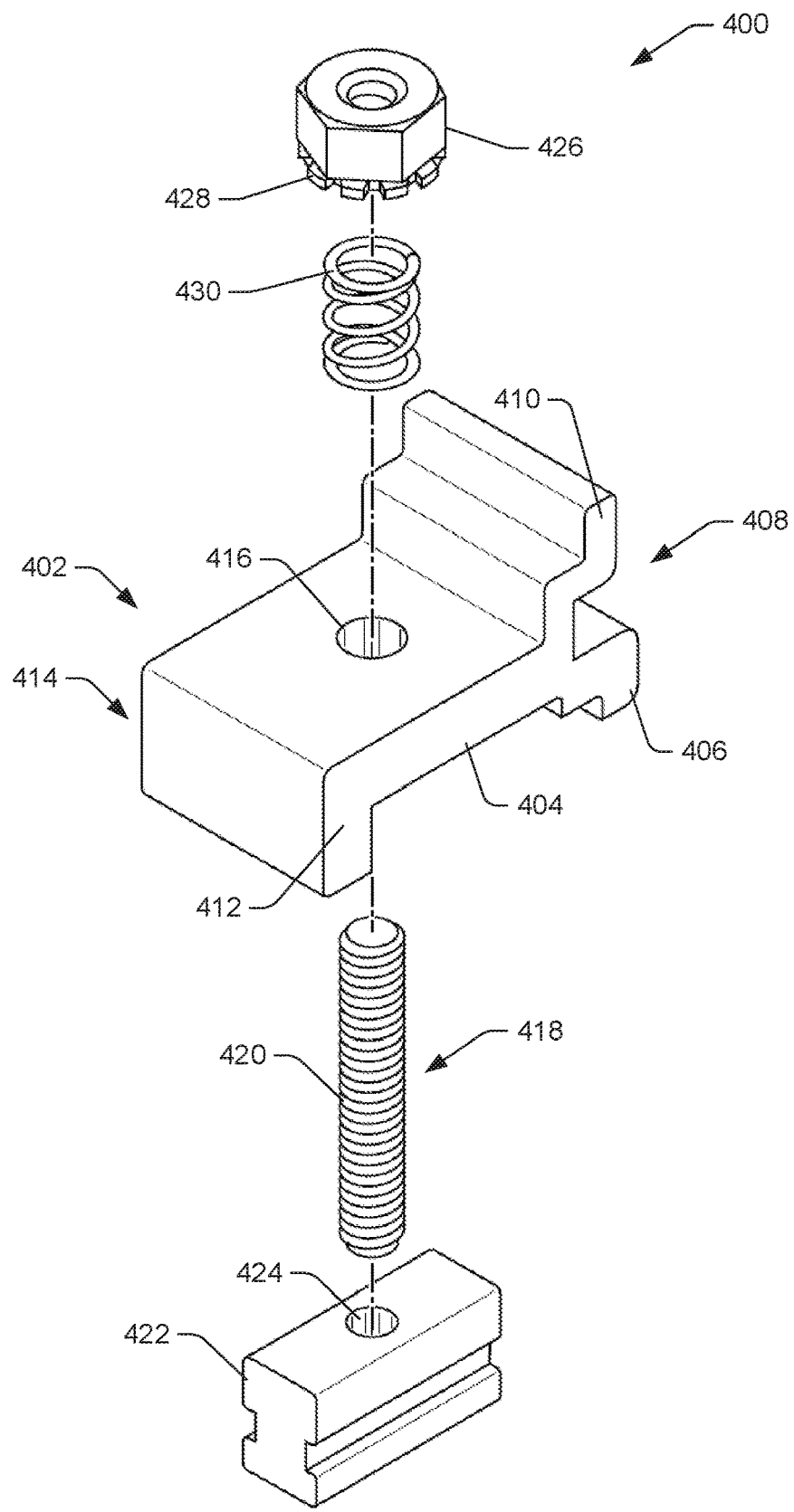
FIG. 4 illustrates a perspective view of a clip assembly of the support system, according to an embodiment of this disclosure.

FIG. 4 depicts a perspective view of a clip assembly 400 of the support system 100. In an embodiment, and as shown and described further herein below, the clip assembly 400 may be configured to couple a first rail to a second rail where the second rail extends in a direction transverse to the first rail. Additionally, and/or alternatively, the clip assembly 400 may couple a rail to an L-foot bracket or other component of the support system, as shown and described further herein. The clip assembly 400 includes a clip 402. The clip 402 includes a base 404 extending in a first plane. In an embodiment, the clip 402 includes a first flange 406 extending from a first end 408 of the base 404 in a first direction. The clip 402 further includes an arm 410 extending from the base 404 in a second direction opposite the first direction. The arm 410 extends from the first end 408 of the base 404. The clip 402 further includes a second flange 412 extending from a second end 414 of the base 404 in a third direction that is substantially parallel with the first direction. The second flange 412 provides space between the base 404 of the clip 402 and a component to which the clip assembly 400 is secured by a fixed distance.

Furthermore, the base 404 of the clip 402 includes an aperture 416 through a thickness of the base 404 that is configured to receive at least a portion of a fastener 418 therein. In an embodiment, the fastener 418 may include a threaded rod 420 to which a nut 422 is configured to be secured to a first end of the fastener 418. For example, the nut 422 may include an aperture 424 therein that includes threading that is configured to correspond with threading of the fastener 418 such that when the fastener 418 is rotated, a relative position of the fastener 418 and/or the nut 422 is adjusted. In an embodiment, the nut 422 may be an elongated I-shaped nut that is shaped to be insertable into the first slot 202 or the second slot 210 of the rail 104. As such, the nut 422 may be secured via a longitudinal side thereof to a slot of the rail 104, i.e., one side or half of the "I" shape of the nut 422 forms a "T" shape, which is accommodated within a slot of the rail 104 when the clip assembly 400 is secured to the rail 104. The fastener 418 further includes a hex nut 426 that is configured to be secured to a second end of the fastener 418. In an alternative embodiment, the hex nut 426 may be a bolt head that is integral with the threaded rod 420. As shown in FIG. 4, the fastener 418 may include a washer 428 that is disposed between the hex nut 426 and a spring 430. In an embodiment, the spring 430 is disposed between the hex nut 426 and the clip 402 and exerts an expansive force between the hex nut 426 and the clip 402 when the spring is at least partially compressed. As such, when the nut 422 is inserted into a slot of the rail 104, the spring 430 may prevent the clip assembly 400 from sliding along the rail 104 when the rail 104 is tilted.

Figure 5:
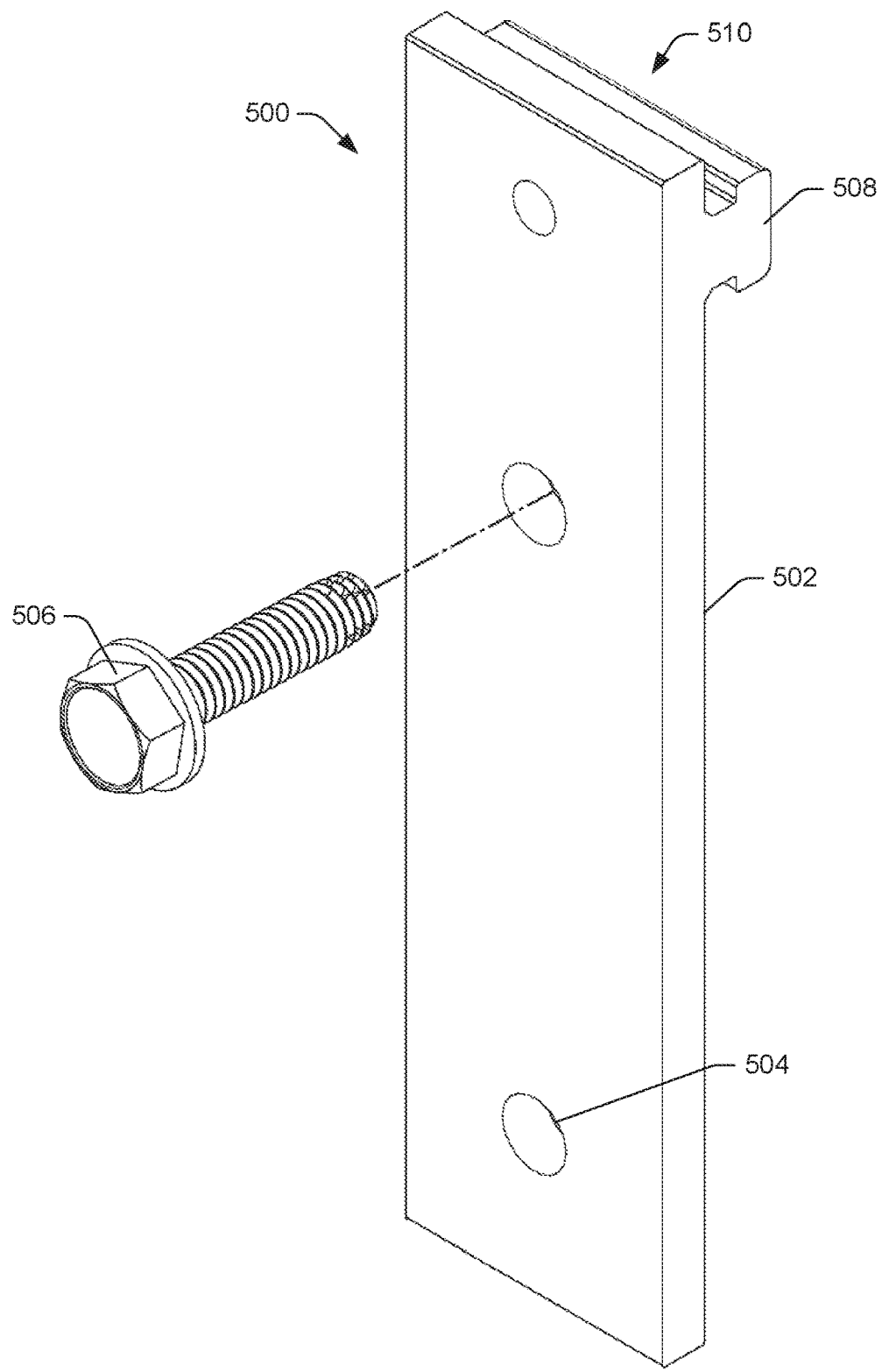
FIG. 5 illustrates a perspective view of a bracket of the support system, according to an embodiment of this disclosure.

FIG. 5 depicts a perspective view of a bracket 500 of the support system 100. The bracket 500 may be implemented in the support system 100 to couple multiple rails together. Such configurations are shown and described further herein below. The bracket may include a body 502 extending longitudinally in a plane, the body 502 being longer than it is wide. The body 502 of the bracket 500 may include one or more apertures 504 therein through which fasteners 506 may be inserted to couple the bracket 500 to another component of the support system 100. The bracket 500 further includes a protrusion 508 extending from a side of the body 502 of the bracket 500 proximate an end 510 of the bracket 500. The protrusion 508 may have a T-shaped profile that corresponds with a shape of the first slot 202 and/or the second slot 210 such that the protrusion 508 of the bracket is insertable therein. Further, the profile of the protrusion 508 is oriented such that the protrusion extends across a width of the body 502

Figure 6:
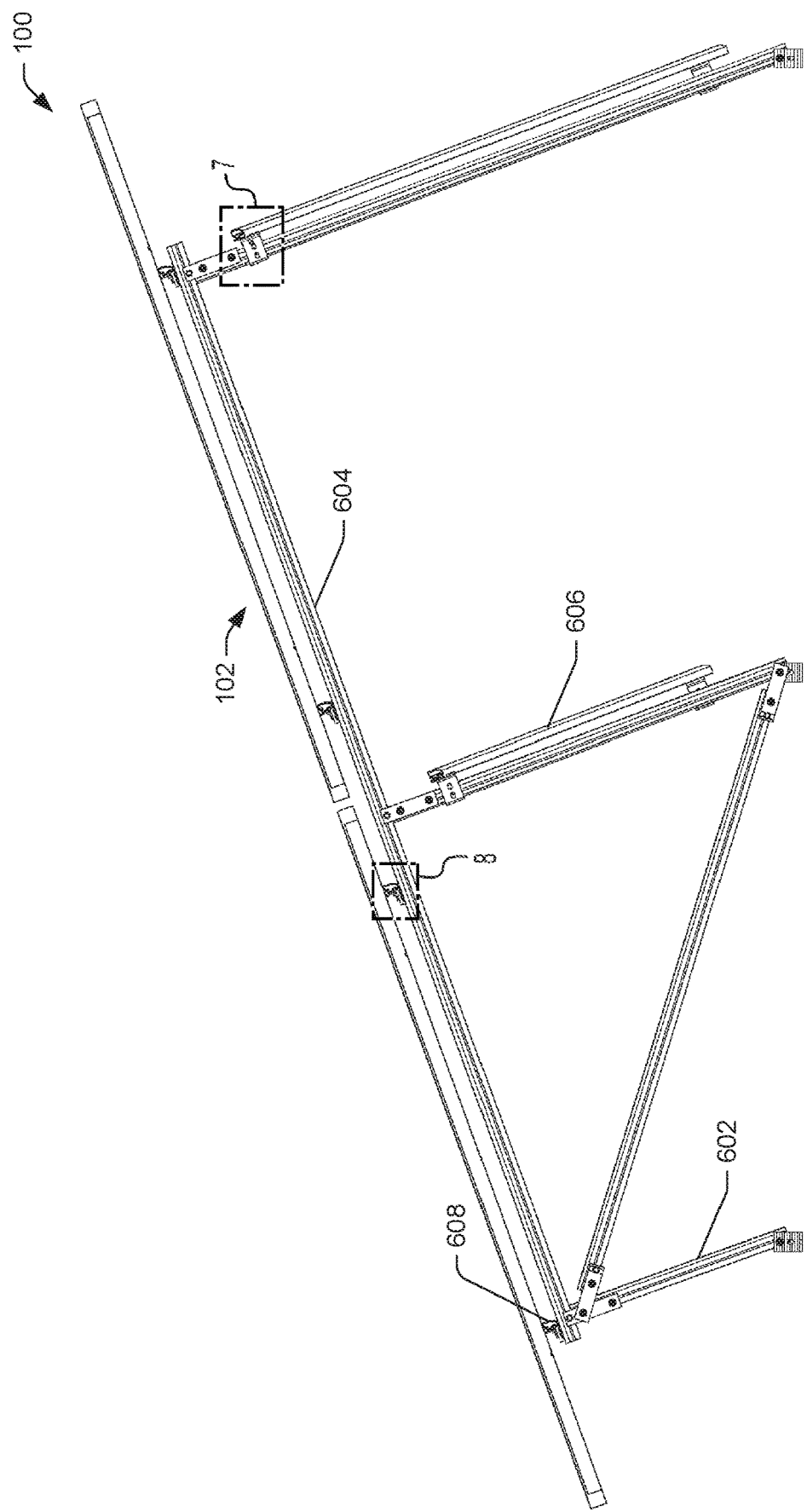
FIG. 6 illustrates a side view of the photovoltaic module support system shown in FIG. 1, according to an embodiment of this disclosure.

FIG. 6 depicts a side view of the support system 100 shown in FIG. 1. As shown in FIG. 6, the support system 100 is configured to support the PV modules 102 such that the PV modules 102 are raised from a surface on which the support system 100 and PV modules 102 are mounted. As described previously, the support system 100 includes legs 602 formed by rails 104 extending between the surface on which the support system 100 is mounted and longitudinal members 604 of the support system 100. The longitudinal members 604 are likewise formed by rails 104 that are coupled to the legs 602 of the support system 100. The support system 100 may further include braces 606 formed by rails 104 that extend between legs 602 of the support system 100 and are configured to provide additional structural strength and support to the support system 100. The support system 100 may also include crossmembers 608 formed by rails 104 that extend in a direction that is transverse to the longitudinal members 604. As shown in FIG. 6, the PV modules 102 may be mounted to the crossmembers 608 of the support system 100. As mentioned previously, the rails 104 used to form the legs 602, the longitudinal members 604, the braces 606, and the crossmember 608, may include the features of the rail 104 shown and described with respect to FIG. 2. Such features allow the rails 104 to be implemented in different locations and in different mount assemblies. Example mount assemblies are shown and described in the following figures and corresponding descriptions.

Figure 7:
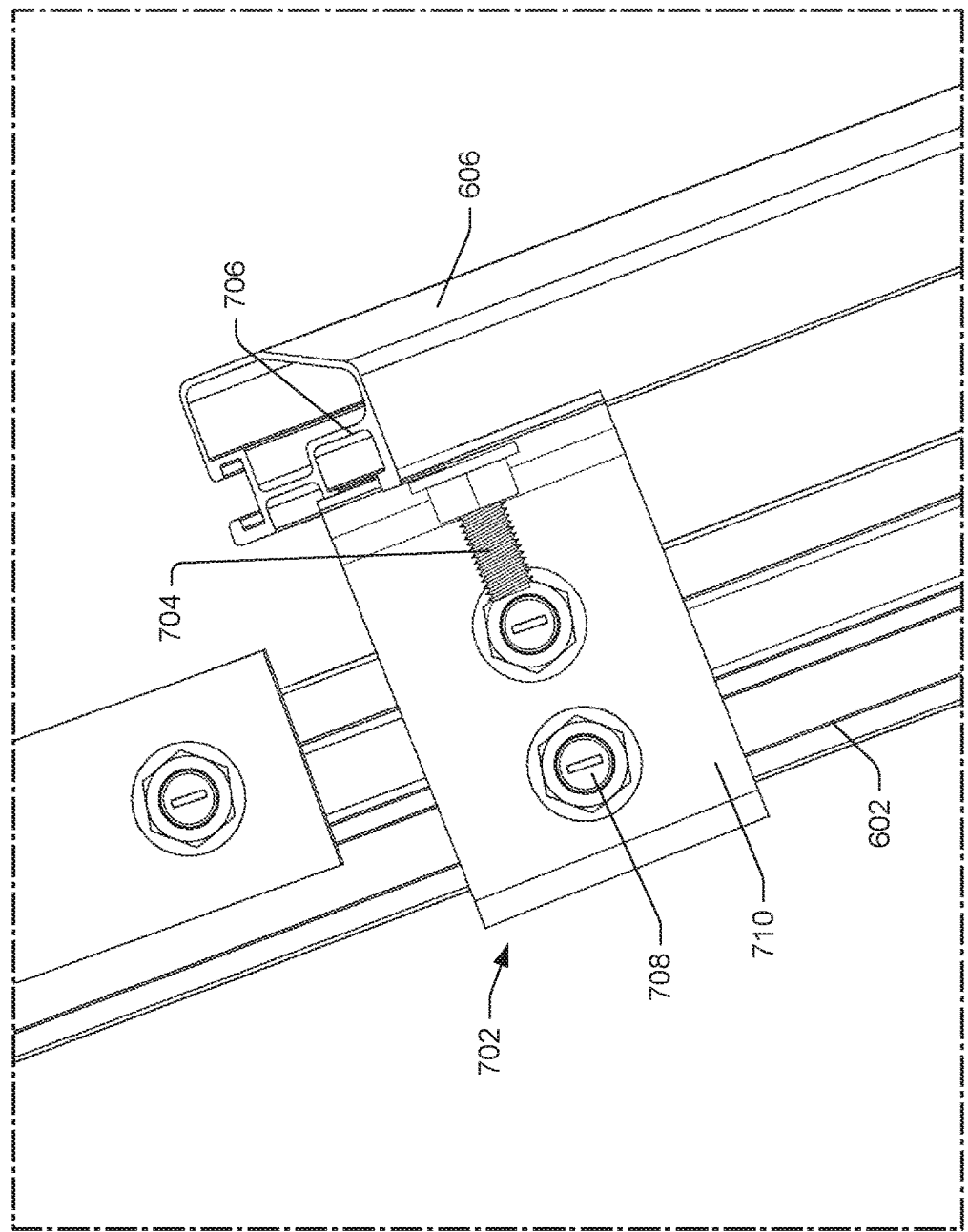
FIG. 7 illustrates a detail view of a mount assembly shown in FIG. 6, taken at location 7, according to an embodiment of this disclosure.

FIG. 7 depicts a detail view of an example mount assembly 700 shown in FIG. 6, taken at location "7". The mount assembly 700 of FIG. 7 depicts an example connection between a leg 602 and a brace 606 of the support system 100. In an embodiment, the leg 602 and the brace 606 may be coupled to each other via a bracket, such as an L-foot bracket 702. The L-foot bracket 702 may include a base having a fastener 704 inserted therethrough. At least a portion of the fastener 704 inserted through the base of the L-foot bracket 702 may be secured within a slot 706 of the brace 606. Meanwhile, the mounting assembly 700 may include fasteners 708 that are inserted through a leg 710 of the L-foot bracket 702. The fasteners 708 that pass through the leg 710 of the L-foot bracket 702 may be secured within the leg 602 of the support system 100. In an embodiment, at least a portion of the fasteners 708 may be secured within a slot of the rail and/or the fasteners 708 may be drilled into a cavity of the rail. As such, the brace 606 may be coupled to the leg 602 via the mounting assembly 700 having an L-foot bracket 702.

Figure 8:
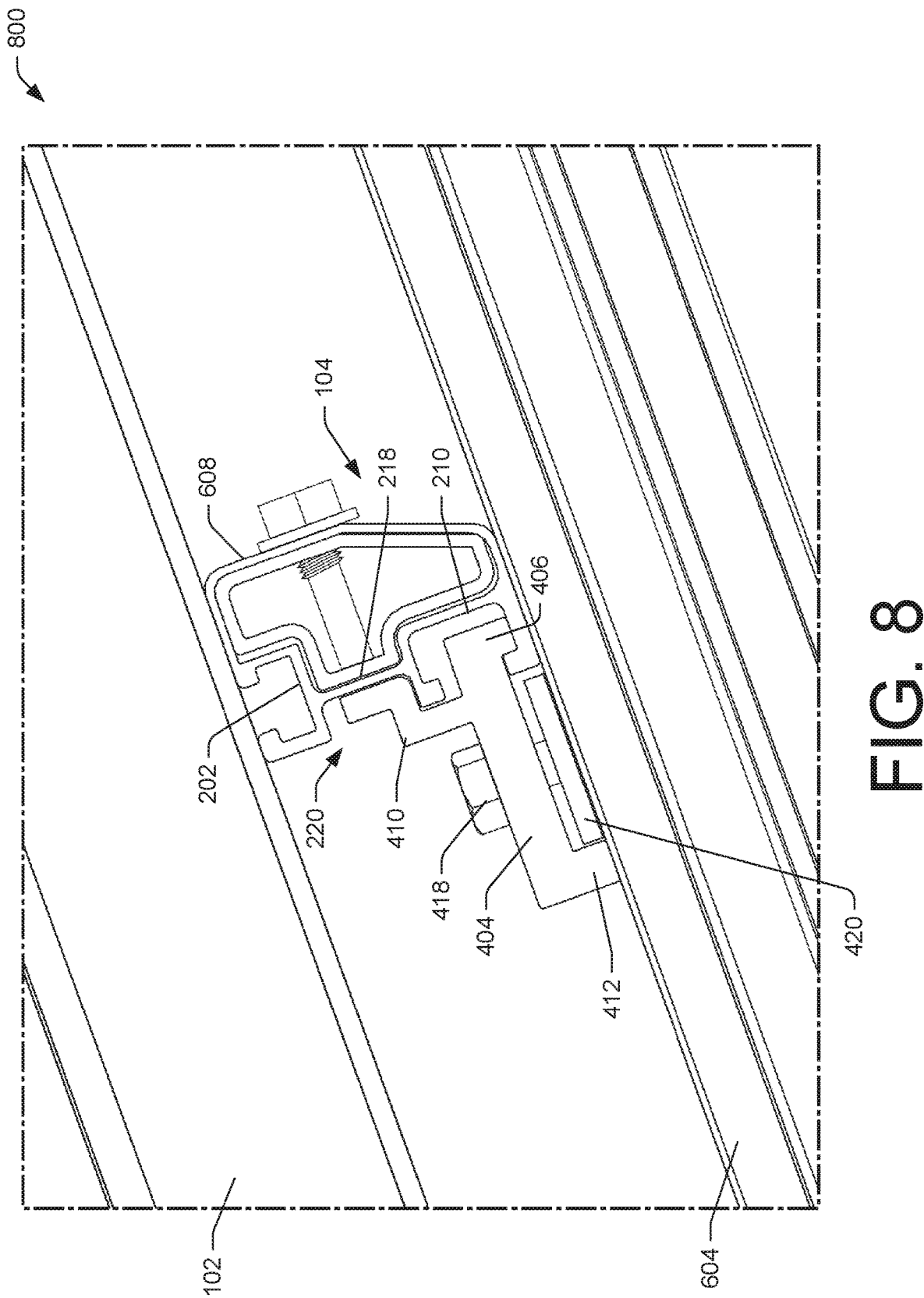
FIG. 8 illustrates a detail view of a mount assembly shown in FIG. 6, taken at location 8, according to an embodiment of this disclosure.

FIG. 8 depicts a detail view of an example mount assembly 800 shown in FIG. 6, taken at location "8". The example mount assembly 800 shown in FIG. 8 depicts a junction between a longitudinal member 604 and a crossmember 608 having a PV module 102 mounted on the crossmember 608. In an embodiment, the longitudinal member 604 may be coupled to the crossmember 608 via the clip assembly 400 shown and described with respect to FIG. 4. As described previously, the crossmember 608 is formed by a rail 104 and includes a first slot 202, a second slot 210, and a web 218 extending between the first slot 202 and the second slot 210. The web 218 may be offset from a plane along the outside surface of the rail 104, thereby forming a recess 220 in the rail 104.

The clip assembly 400 may be configured to be secured to the crossmember 608 and the longitudinal member 604, thereby coupling the crossmember 608 to the longitudinal member 604. For example, the clip 402 includes a base 404 having a first flange 406 extending from the base 404 in a first direction. The first flange 406 is configured to be inserted into the second slot 210 of the crossmember 608, as shown in FIG. 8. The clip 402 also includes an arm 410 extending form the base 404 and configured to be inserted within the recess 220 such that the arm 410 abuts the web 218 of the rail 104. By having a clip assembly 400 that includes multiple points of contact (e.g., 406 and 410) with the rail 104, the rail 104 may include a reduced thickness as the multiple points of contact distribute a force of the clip assembly 400 to portions of the rail 104. If a single point of contact was used, a thickness of the rail 104 may need to be increased otherwise the rail 104 may not be capable of carrying a load imparted on the rail 104. Furthermore, the multiple points of contact may prevent and/or greatly improve resistance to the crossmember 608 rotating if a downslope load is imparted on the PV modules 102 and/or support system 100. Without the multiple points of contact, the crossmember 608 may rotate due to force of the PV module 102 pushing on top of the crossmember 608.

Furthermore, the nut 422 of the clip assembly 400 is inserted into a slot of the longitudinal member such that the nut 422 is secured therein. The fastener 418 may be adjusted to in order to secure the clip 402 to the longitudinal member 604 while also exerting a down force on the crossmember 608 via the flange 406 and the arm 410 of the clip 402. As such, the clip assembly 400 may be configured to couple the longitudinal member to the crossmember 608.

Figure 9:
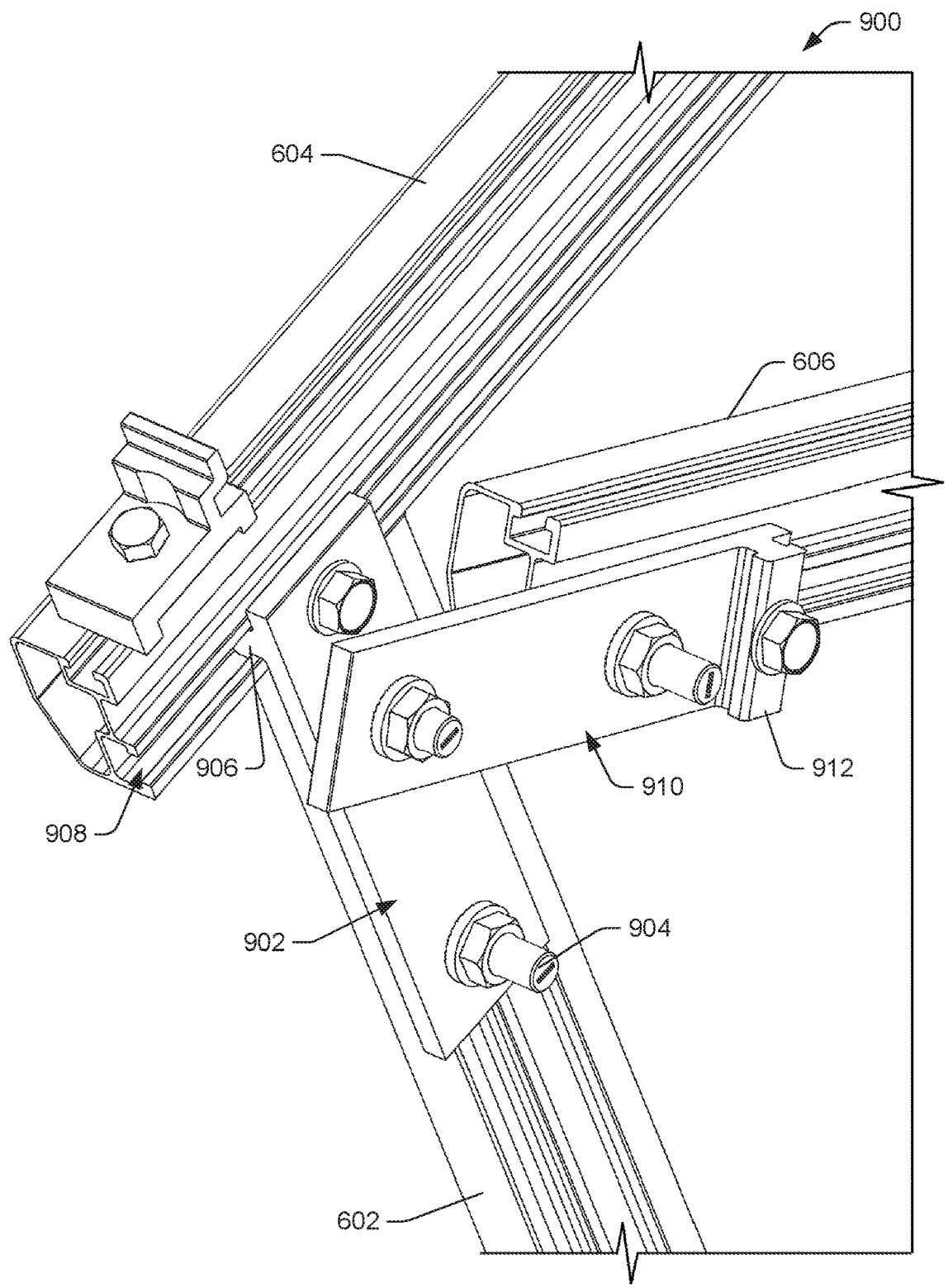
FIG. 9 illustrates a perspective view of a mount assembly, according to an embodiment of this disclosure.

FIG. 9 depicts a perspective view of an example mount assembly 900. The mount assembly 900 of FIG. 9 depicts an example junction of a leg 602, a longitudinal member 604, and a brace 606. As shown in FIG. 9, the leg 602 may be coupled to the longitudinal member 604 via a bracket 902. The bracket 902 may be the same or substantially similar to the bracket 500 shown and described with respect to FIG. 5. In an embodiment, the bracket 902 may be coupled to the leg 602 via fasteners 904 that pass through the bracket 902 and are inserted in the leg 602. In an embodiment, the fasteners 904 are secured within a slot of the leg 602 and/or are drilled into a cavity of the leg 602. Furthermore, an protrusion 906 of the bracket 902 is secured within a slot 908 of the longitudinal member 604, thereby securing the leg 602 to the longitudinal member 604 via the bracket 902.

Furthermore, as shown in FIG. 9, the brace 606 may be coupled to the leg 602 via a bracket 910. The bracket 910 may be substantially similar to the bracket 500 shown and described with respect to FIG. 5. As shown in FIG. 9, the bracket 910 may be oriented such that the protrusion 912 of the bracket 910 faces away from the brace 606. In such an orientation, the bracket 910 is secured to the leg 602 and the brace 606 via fasteners 904 that are inserted through the bracket 910 to secure the bracket 910 to the brace 606 and the leg 602, thereby coupling the brace 606 to the leg 602.

Figure 10:
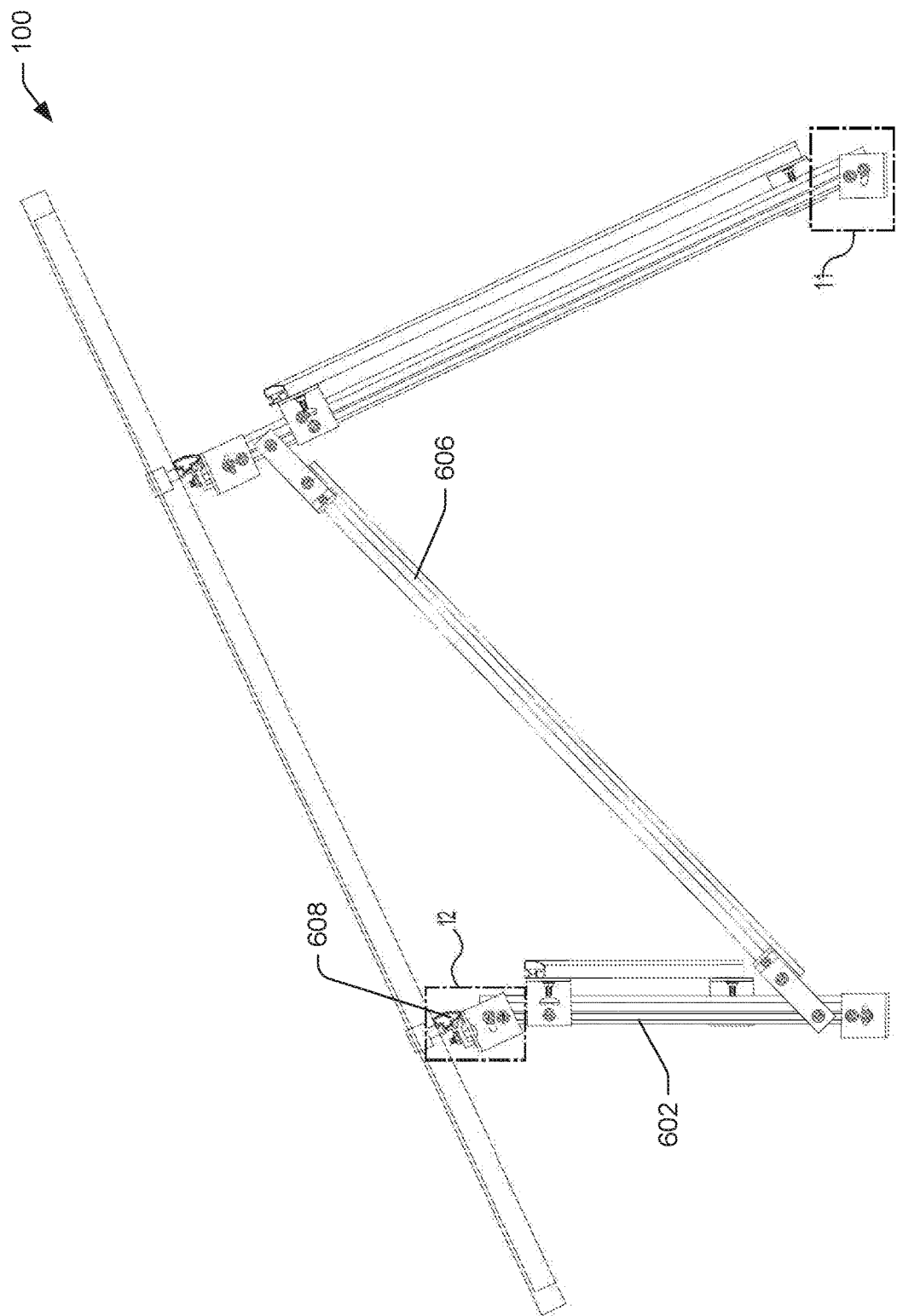
FIG. 10 illustrates a side view of a photovoltaic module support system, according to an embodiment of this disclosure.

FIG. 10 depicts the support system 100 in an alternate configuration. As shown in FIG. 10, the support system 100 may be configured to support one or more PV modules in a one high configuration. In such a configuration, the support system 100 may omit longitudinal members, while implementing legs 602, braces 606, and crossmembers 608.

Figure 11:
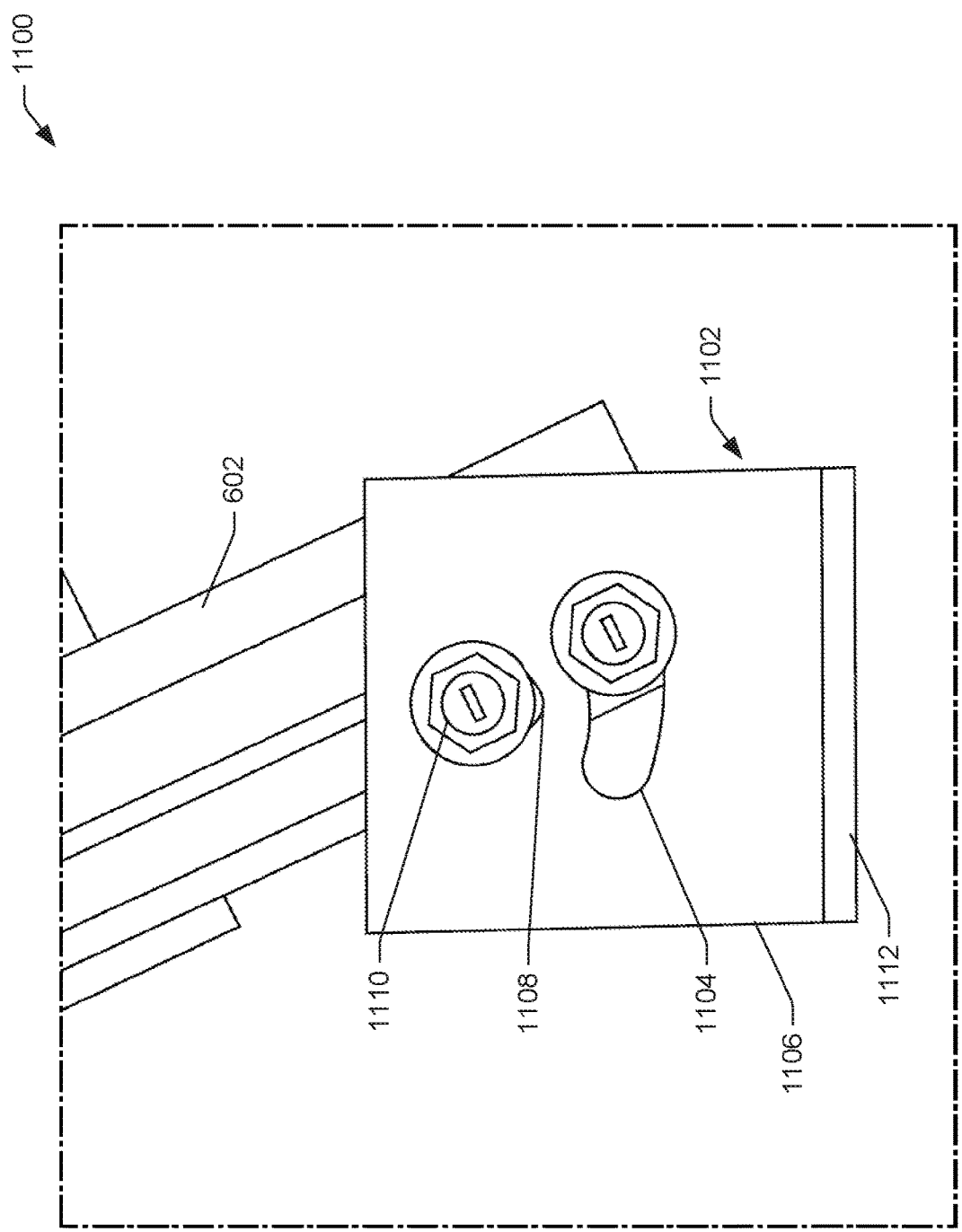
FIG. 11 illustrates a detail view of a mount assembly shown in FIG. 10, taken at location 11, according to an embodiment of this disclosure.

FIG. 11 depicts a detail view of an example mount assembly 1100 shown in FIG. 10, taken at location "11". The mount assembly 1100 shown in FIG. 11 depicts a junction between a leg 602 of the support system 100 and a surface on which the support system 100 is mounted. The mount assembly 1100 may include an L-foot bracket 1102 having a curved aperture 1104 formed in a leg 1106 of the L-foot bracket 1102. The L-foot bracket 1102 also includes an elongated aperture 1108 formed in the leg 1106 of the L-foot bracket 1102. In an embodiment, fasteners 1110 are inserted in the elongate aperture 1108 and the curved aperture 1104 in order to secure the L-foot bracket 1102 to the leg 602. In an embodiment, the curved aperture 1104 allows a rotational position of the L-foot bracket 1102 to be adjusted around the fastener 1110 inserted in the elongated aperture 1108. As such, the mount assembly 1100 shown in FIG. 11 may allow an angle of the legs 602 of the support system 100 to be easily adjusted during assembly of the support system 100. In an embodiment, the leg 1106 of the L-foot bracket 1102 extends in a first direction while a base 1112 of the L-foot bracket extends in a second direction that is substantially perpendicular to the first direction. As shown in FIG. 11, the base 1112 may extend out of the page.

In an embodiment, a single fastener 1110 may be selectively inserted in one of the apertures (e.g., either the elongated aperture 1108 or the curved apertures 1104) depending on a load of the support system 100 and/or PV modules 102. For example, if the support system 100 and/or PV modules 102 exert a load on the L-foot bracket 1102 that is below a predetermined threshold, a single fastener may be used to attach the L-foot bracket 1102 to the leg 602 of the support system 100. However, if the support system 100 and/or PV modules 102 exert a load on the L-foot bracket 1102 that is above a predetermined threshold, multiple fasteners may be used to secure the L-foot bracket 1102 to the leg 602 of the support system 100.

Figure 12:
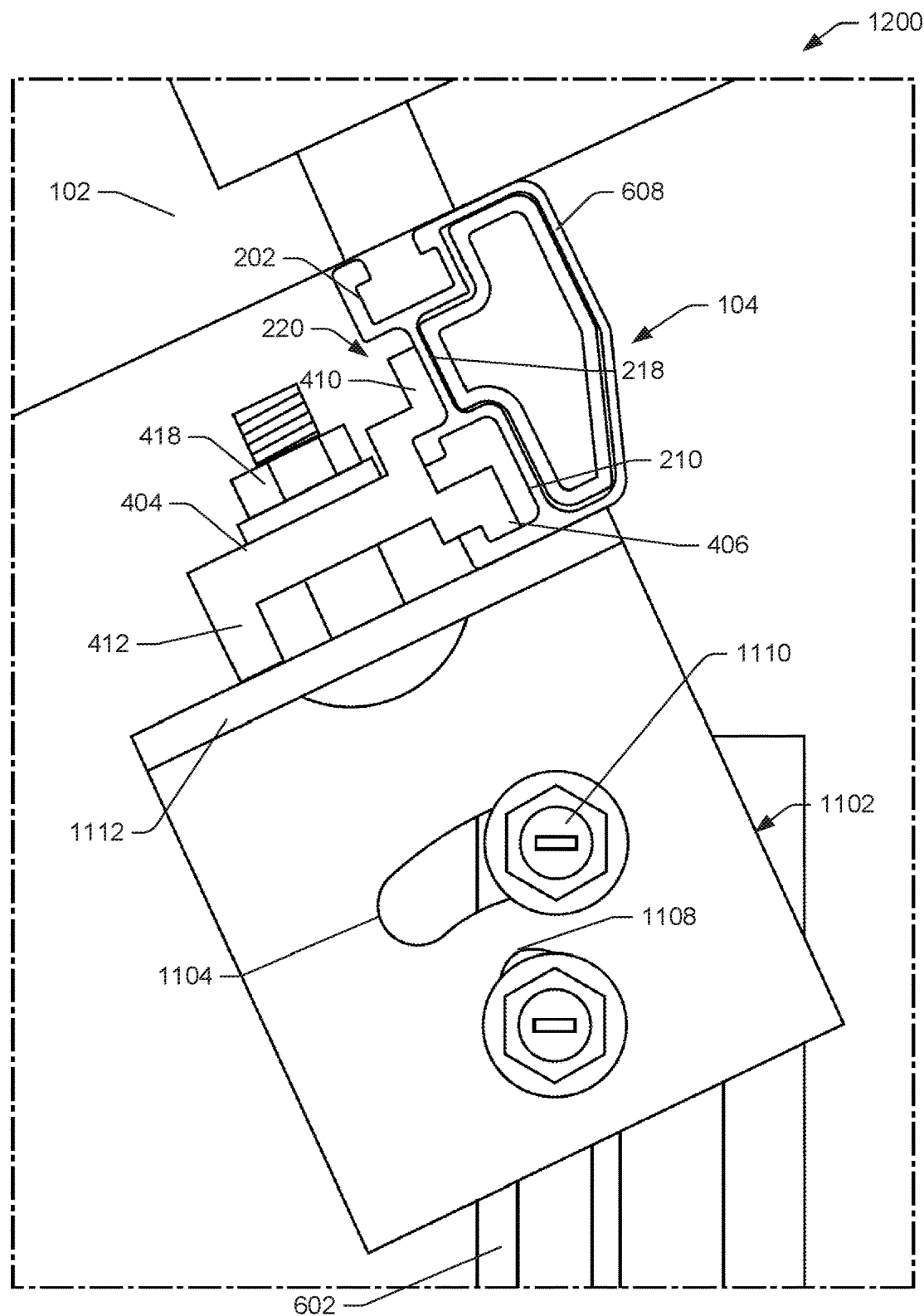
FIG. 12 illustrates a detail view of a mount assembly shown in FIG. 10, taken at location 12, according to an embodiment of this disclosure.

FIG. 12 depicts a detail view of an example mount assembly 1200 shown in FIG. 10, taken at location "12". The mount assembly 1200 shown in FIG. 12 depicts a junction between a leg 602 of the support system 100 and a crossmember 608 of the support system 100. As shown in FIG. 12, the mount assembly 1200 may include an L-foot bracket 1102 to couple the leg 602 to the crossmember 608. As mentioned previously, the curved aperture 1104 of the L-foot bracket 1102 allows a position of the L-foot bracket 1102 to be adjusted to accommodate a crossmember 608 and a PV module 102 thereon.

As shown in FIG. 12, the mount assembly 1200 includes features similar to those described above with respect to FIG. 8. For example, the mount assembly 1200 includes a crossmember 608 coupled to a clip 402 that is configured to engage various features of the crossmember 608. However, the clip assembly 400 may be coupled to the L-foot bracket 1102 instead of a longitudinal member, as in FIG. 8. The clip assembly 400 may be secured to the L-foot bracket 1102 via the fastener 418 of the clip assembly 400. Furthermore, the L-foot bracket 1102 is coupled to the leg 602 of the support system 100 via fasteners 1110. As such, the mount assembly 1200 shown in FIG. 12 provides a junction between a crossmember 608 and a leg 602 of the support system 100.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A mounting assembly comprising:
a rail configured to at least partially support a photovoltaic module, the rail including:
a first slot formed in a first side of the rail,
a second slot formed in a second side of the rail, and
a web extending between the first slot and the second slot, the web being offset from a plane extending along an outer surface of the rail, so as to form a recess in the second side of the rail; and
a clip configured to be secured to the rail and to a secondary structure, the clip including:
a base having:
a flange extending from a first end of the base in a first direction, the flange being inserted in the second slot when the clip is secured to the rail and the secondary structure, and
an aperture through a thickness of the base such that a fastener is insertable through the aperture to secure the clip to the secondary structure, and
an arm extending from the base in a second direction opposite the first direction, at least a portion of the arm abutting the recess of the rail when the clip is secured to the rail.

2. The mounting assembly of claim 1, wherein the rail is a first rail and the mounting assembly further comprises:
an L-foot bracket coupled to a support surface;
a second rail coupled to the secondary structure and the L-foot bracket such that the second rail extends between the secondary structure and the L-foot bracket, thereby supporting the secondary structure, the second rail being substantially perpendicular to a direction of extension of the secondary structure and the second rail including a slot formed in a side of the second rail; and
a bracket coupled to the second rail such that the bracket extends past an end of the second rail, the bracket including a protrusion proximate an end of the bracket, and the protrusion being configured to be secured within a slot of the secondary structure, thereby coupling the second rail to the secondary structure.

3. The mounting assembly of claim 1, wherein:
the rail is a first rail and the secondary structure is a second rail having a slot formed therein, and
the fastener includes a bolt and corresponding nut, the nut configured to be secured in the slot of the second rail such that the bolt passes through the aperture in the base and is secured to the nut, thereby securing the clip to the second rail.

4. The mounting assembly of claim 1, wherein the flange is a first flange,
wherein the base includes a second flange extending from a second end of the base in the first direction, and
wherein the second flange spaces the base of the clip from the secondary structure when the clip is secured to the secondary structure.

5. The mounting assembly of claim 1, wherein the plane is a first plane, the outer surface is a first outer surface, and the first slot is disposed below a second plane extending along a second outer surface of the of the first rail.

6. The mounting assembly of claim 1, wherein the rail is a first rail and the first rail includes a first cavity extending along a length of the first rail, wherein the first cavity is shaped to receive a splice rail therein and the splice rail is configured to be insertable into a second cavity of a second rail, thereby connecting the first rail to the second rail.

7. The mounting assembly of claim 1, wherein the first slot and the second slot extend along a length of the rail.

8. A mounting assembly comprising:
a rail configured to at least partially support a photovoltaic module, the rail including:
a first slot formed in a first side of the rail,
a second slot formed in a second side of the rail, and
a web extending between the first slot and the second slot, the web being offset from a plane extending along an outer surface of the rail, so as to form a recess in the second side of the rail; and
a clip configured to be secured to the rail and to a secondary structure, the clip including:
a base having:
a first flange extending from a first end of the base in a first direction, the first flange being inserted in the second slot when the clip is secured to the rail and the secondary structure, and
a second flange extending from a second end of the base in the first direction, and the second flange spaces the base of the clip from the secondary structure when the clip is secured to the secondary structure, and
an arm extending from the base in a second direction opposite the first direction, at least a portion of the arm abutting the recess of the rail when the clip is secured to the rail.

9. A mounting assembly comprising:
a rail configured to at least partially support a photovoltaic module, the rail including:
a first slot formed in a first side of the rail,
a second slot formed in a second side of the rail, and
a web extending between the first slot and the second slot, the web being offset from a plane extending along an outer surface of the rail, so as to form a recess in the second side of the rail; and
a clip configured to be secured to the rail and to a secondary structure, the clip including:
a base having a flange extending from a first end of the base in a first direction, the flange being inserted in the second slot when the clip is secured to the rail and the secondary structure, and
an arm extending from the base in a second direction opposite the first direction, at least a portion of the arm abutting the recess of the rail when the clip is secured to the rail
wherein the rail is a first rail and further includes a first cavity extending along a length of the first rail, the first cavity shaped to receive a splice rail that is configured to be insertable into a second cavity of a second rail, thereby connecting the first rail to the second rail.

* * * * *